J. COHN.

Boxes.

No. 5,781. Reissued March 10, 1874.

*Witnesses:*

A. L. McIntire

Jacob Feibel

*Inventor:*

Joseph Cohn by his atty.

E. J. McIntire

UNITED STATES PATENT OFFICE.

JOSEPH COHN, OF NEW YORK, N. Y.

IMPROVEMENT IN BOXES.

Specification forming part of Letters Patent No. 121,156, dated November 21, 1871; reissue No. 5,781, dated March 10, 1874; application filed February 11, 1874.

DIVISION A.

*To all whom it may concern:*

Be it known that I, JOSEPH COHN, of the city, county, and State of New York, have invented a new and useful Improvement in Boxes; and I do hereby declare the following to be such a full, clear, and exact description thereof as will enable those skilled in the art to make and use the same, reference being had to the accompanying drawings, forming part of this specification, in which drawing—

Figure 1:
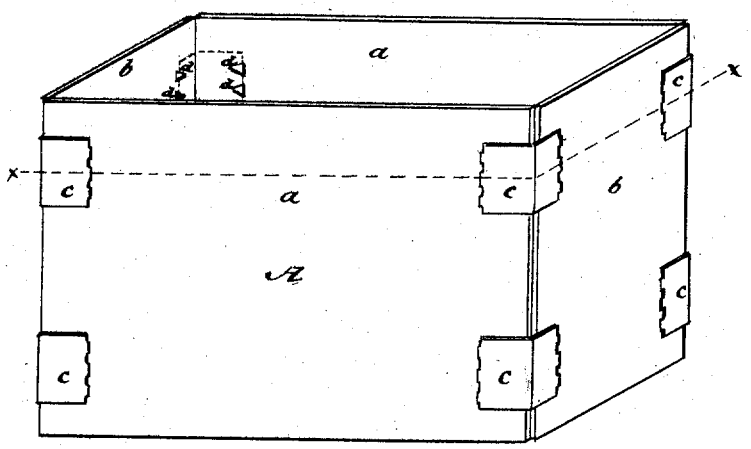
Figure 2:
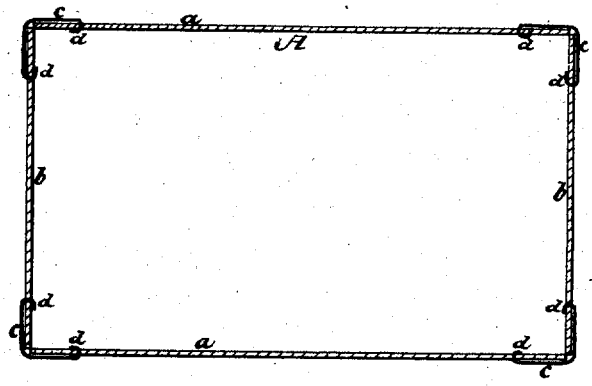
Figure 3:
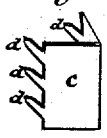
Figure 4:
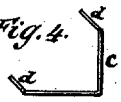

Figure 1 represents, in perspective view, one of my improved boxes. Fig. 2 is a horizontal section of the same in the plane indicated by dotted line *x x*, Fig. 1. Fig. 3 is a perspective view of one of my metallic corner-pieces, and Fig. 4 is a cross-section of the same.

Similar letters in the several views designate the same part.

My invention relates more particularly to that kind of boxes which are made of thick paper, card-board, &c., and used for the package of various articles of manufacture.

In all sorts of paper and pasteboard boxes as made previous to my invention, the liability and tendency to give way at the corners, or where the several planes are bent or united to form the box, has proved a serious objection. Where the box angles formed by any two planes or sides of the box occurred, it is customary to either form such angle by scarfing (or partially cutting through) the board or card, and bending it to the desired angle, or by bringing together and uniting by paste and thin covering-paper, or otherwise, two separate pieces of the board, and in either case the line or angle at which this bending of a single piece, or uniting of separate pieces occurred, would be the weak point, and the boxes would invariably first give way or break open at such point.

By my invention this serious difficulty has been perfectly overcome, and boxes of all sorts of shape and size produced, which are perfectly durable, and much more desirable than any heretofore made.

My invention consists in the employment, in connection with, or in combining with, the material of which the planes or sides of the box are formed, metallic corner plates or clasps, which are so made and applied as to securely tie together the boards or planes where their adjacent edges form an angle, and thus effectually prevent the severance of these planes at the angle formed by them, all as will be presently more fully explained.

In the accompanying drawings, A is a box, the body of which is made of side and end pieces *a* and *b*, and which has a suitable bottom, all about as usual; but with the corners formed by the junction of the side pieces *a*, and end pieces *b* strengthened or tied by means of metallic clasps or corner pieces *c*, according to my invention. The metallic corner-pieces *c* may be stamped up out of sheet metal, and are formed, as shown, (see Figs. 3 and 4,) with sharp spurs or points *d*, adapted to penetrate the side pieces of the box, and which are after their insertion clinched in the inside of the box, as illustrated. These corner-pieces are made with their plane portions to conform in the angle or shape to the angle of the boxes to which they are to be applied, which is generally a right angle, and with their points or spurs *d* arranged about parallel to each other, and at the same angle (on each side) to the plane portions of the clasp. The clasps or corner pieces may be inserted and secured, as shown, near the upper and lower extremities of each corner or angle of the box, or they may be differently located at the option of the box manufacturer.

It is obvious that these uniting or strengthening clasps may be employed in like manner to unite the bottom of the box to the four sides, or to strengthen the angles formed by the bottom with the sides, when said bottom and sides are all formed out of one piece of card-board, by scarfing and bending it up into box-shape. Any number of clasps may, of course, be employed at each corner, and their design may be varied to suit the character of the box and taste of the maker.

I am aware that metallic corner-pieces have been applied to boxes by rivets, and that they have also been made to overlap the upper edges, and secured by indenting them at given points by a puncturing-tool.

Having so fully explained my invention, that any skilled manufacturer of boxes can fully understand and practice it, what I claim as new in the manufacture of boxes, and desire to secure by Letters Patent, is—

The combination, with the planes or sides of a box, of metallic angle plates or clasps, shaped to conform to the angle they embrace, and secured in position by spurs or points formed on said clasps, as described, whereby the adjacent edges or angle of the box is sustained and strengthened, as hereinbefore set forth.

In testimony whereof I have hereunto set my hand and seal this 10th day of January, 1874.

JOSEPH COHN. [L. S.]

In presence of—
A. ASCHER,
JACOB FELBEL.